United States Patent
Ito

(10) Patent No.: US 8,677,311 B2
(45) Date of Patent: Mar. 18, 2014

(54) SEPARATE-TYPE SIGNAL PROCESSING APPARATUS AND SOFTWARE VERSION UPDATING METHOD THEREFOR

(75) Inventor: Masaki Ito, Tokyo (JP)

(73) Assignee: Sony Corporation (JP)

( * ) Notice: Subject to any disclaimer, the term of this patent is extended or adjusted under 35 U.S.C. 154(b) by 1875 days.

(21) Appl. No.: 11/589,540

(22) Filed: Oct. 30, 2006

(65) Prior Publication Data
US 2007/0101393 A1   May 3, 2007

(30) Foreign Application Priority Data
Oct. 31, 2005  (JP) ................. P2005-316816

(51) Int. Cl.
*G06F 9/44* (2006.01)

(52) U.S. Cl.
USPC ............................ 717/104; 725/132; 725/140

(58) Field of Classification Search
USPC .......................................... 725/132; 717/104
See application file for complete search history.

(56) References Cited

U.S. PATENT DOCUMENTS

| | | | |
|---|---|---|---|
| 5,692,155 A * | 11/1997 | Iskiyan et al. | 711/162 |
| 6,343,379 B1 * | 1/2002 | Ozawa et al. | 725/63 |
| 6,678,741 B1 * | 1/2004 | Northcutt et al. | 709/248 |
| 6,687,901 B1 * | 2/2004 | Imamatsu | 717/173 |
| 2002/0144251 A1 | 10/2002 | Cho | |
| 2003/0046434 A1 * | 3/2003 | Flanagin et al. | 709/248 |
| 2003/0139857 A1 * | 7/2003 | Hayashi et al. | 701/1 |
| 2003/0214507 A1 * | 11/2003 | Mawatari et al. | 345/530 |
| 2004/0098715 A1 * | 5/2004 | Aghera et al. | 717/173 |
| 2004/0237078 A1 * | 11/2004 | Weiss et al. | 717/168 |
| 2005/0120384 A1 * | 6/2005 | Stone et al. | 725/132 |
| 2006/0215994 A1 * | 9/2006 | Sasabe | 386/95 |
| 2007/0101393 A1 * | 5/2007 | Ito | 725/132 |

FOREIGN PATENT DOCUMENTS

| | | |
|---|---|---|
| EP | 0 907 285 | 4/1999 |
| EP | 1 324 197 | 7/2003 |
| EP | 1610553 | 12/2005 |
| JP | 2001-256055 A | 9/2001 |
| JP | 2004-029876 A | 1/2004 |
| JP | 2005-222140 A | 8/2005 |

(Continued)

OTHER PUBLICATIONS

Lizhou Yu; Shoja G C; Muller H A; Srivivasan A, "A framework for live software upgrade" Nov. 12, 2002, pp. 149-159.

*Primary Examiner* — Don Wong
*Assistant Examiner* — Theodore Hebert
(74) *Attorney, Agent, or Firm* — Lerner, David, Littenberg, Krumholz & Mentlik, LLP

(57) ABSTRACT

A separate-type signal processing apparatus includes: a first device having a data acquisition part; and a second device connected with the first device by wire or wireless, wherein the first and second devices work in cooperation to execute a predetermined process, the first device acquires version renewal data for addition to or renewal of software components for respectively controlling the first and second devices, through the data acquisition part, the first device has a first control part for sending a completion-of-acquisition notice signal to the second device, the second device has a second control part for sending a response signal to the first control part when the notice signal is input thereto, and the first control part transfers at least a part of the acquired version renewal data to the second control part on receipt of the response signal as an input thereto.

7 Claims, 5 Drawing Sheets

(56) References Cited

FOREIGN PATENT DOCUMENTS

| WO | WO-98/52355 | 11/1998 |
| WO | 2004091207 | 10/2004 |
| WO | WO-2004/091207 | 10/2004 |
| WO | WO-2005/069660 | 7/2005 |

\* cited by examiner

SEPARATE-TYPE SIGNAL PROCESSING APPARATUS AND SOFTWARE VERSION UPDATING METHOD THEREFOR

CROSS REFERENCES TO RELATED APPLICATIONS

The present invention contains subject matter related to Japanese Patent Application JP 2005-316816 filed in the Japanese Patent Office on Oct. 31, 2005, the entire contents of which being incorporated herein by reference.

BACKGROUND OF THE INVENTION

1. Field of the Invention

The present invention relates to a separate-type signal processing apparatus having a first device including a data acquisition part and a second device connected by wire or wireless with the first device, in which the software components for the first and second devices work in cooperation to carry out a predetermined process, and to a method of updating the version of each software component.

2. Related Art

For example, with the digital broadcast, there has been proposed the method by which a software component for a broadcast receiver is downloaded to overwrite (update) an existing software component of the broadcast receiver when the program that the broadcast receiver executes is subjected to version renewal including addition, changes, etc. (see e.g. JP-A-2005-222140 (Patent Document 1)).

Data for version upgrade of a program, etc. of a broadcast receiver (i.e. a program for update) is multiplexed with broadcast waves and sent out from a broadcast station. The program for update has been delivered to the broadcast station from a supplier of the program previously. The broadcast receiver extracts the program for update from the received broadcast waves thereby to acquire the targeted program. Then, the broadcast receiver uses the acquired update program to carry out the version upgrade (update) concerning the program, etc. that the broadcast receiver executes.

The word "download" is used in two ways: in a narrow sense, to acquire and temporarily save data, etc. from a server, a broadcast station or the like; and in a broad sense, in addition to acquire and save data, etc. likewise, to overwrite existing data after the acquisition. Herein, the word "upload" is used in the narrow sense of acquiring data, etc., and the other word "update" (particularly "version upgrade" in the case of a program or the like) is used for an action to overwrite existing data.

SUMMARY OF THE INVENTION

There is a possibility that a user executes what a designer has not expected during actual download or update. In the case of e.g. a separate-type device such that a broadcast receiver main body having a receiving part and another device such as a display device are connected through a cable, the cable can be pulled out during update of a software component.

It is often the case that a normal operation of a system is assured on the whole only after the update of a software component has been executed on both the side of the broadcast receiver main body having a receiving part and the side of the display device. Therefore, when the cable is pulled out in the middle of the update, a situation such that e.g. the program, etc. of the broadcast receiver main body have been renewed to the ones of the latest version, whereas the program, etc. of the other device connected with the main body by the cable remain in the old version can develop. In this case, the system may not operate normally on the whole or its activation may not be performed normally.

It is desirable to provide a separate-type signal processing apparatus which can prevent a situation such that the editions (versions) of software components differ between devices interconnected by wire or wireless from occurring, and a method of renewing the versions of the software components thereof.

A separate-type signal processing apparatus according to an embodiment of the invention includes: a first device having a data acquisition part; and a second device connected with the first device by wire or wireless. In the separate-type signal processing apparatus, the first and second devices work in cooperation to execute a predetermined process, the first device acquires version renewal data for addition to or renewal of software components through the data acquisition part, the first device has a first control part for sending a completion-of-acquisition notice signal to the second device, the second device has a second control part for sending a response signal to the first control part when the notice signal is input thereto, and the first control part transfers at least a part of the acquired version renewal data to the second control part on receipt of the response signal as an input thereto.

It is preferable for the separate-type signal processing apparatus according to the embodiment of the invention that on input of the response signal, the first control part renews at least a part of the software component run by the first control part itself based on the acquired version renewal data, and transfers the version renewal data to the second control part after the renewal.

The following are preferable for the separate-type signal processing apparatus according to the embodiment of the invention. The first is that the first device has a third control part provided therein. The second is that the third control part works in cooperation with the first control part thereby to execute the predetermined process. The third is that the third control part relays the notice signal sent from the first control part toward the second control part. The fourth is that the third control part sends an error signal to the first control part when the response signal is not returned.

It is preferable for the separate-type signal processing apparatus according to the embodiment of the invention that when it becomes impossible to send a certain predetermined unit while the first control part is sending the version renewal data to the second control part in predetermined units, the first control part repeats sending of the certain unit of version renewal data having failed in sending, and forces the alarm part to warn of the defective connection.

A method according to an embodiment of the invention is a method of renewing versions of software components of a separate-type signal processing apparatus having a first device and a second device connected with the first device by wire or wireless, in which the software components contained in the first and second devices respectively work in cooperation thereby to execute a predetermined process. The method includes the steps of: acquiring version renewal data for addition to or renewal of the software components by the first device; sending a completion-of-acquisition notice signal from the first device to the second device; sending a response signal from the second device to the first control part in response to input of the notice signal; and after the first device has performed renewal of a version of the software component contained therein using the relevant version renewal data on input of the response signal, transferring the version renewal data relevant to the second device from the first device to the second device to perform renewal of a version of the software component contained in the second device.

According to the embodiment of the invention, when the first device acquires the version renewal data of the software component by its built-in data acquisition part, it sends a notice signal to notify the acquisition of the version renewal data from the first control part of the first device to the second control part of the second device.

The second control part sends a response signal back to the first control part on receipt of the notice signal.

At this time, in the case where the first and second devices are interconnected by wire or wireless, the response signal is sent to the first control part in response to sending of the notice signal and as such, the first control part gains the information of the connection between the first and second devices being in good condition. In contrast, when the condition of the connection is defective, no response signal is sent to the first control part and as such, the first control part can gain the information of the connection being in the defective condition.

Then, on input of the response signal, the first control part renews at least a part of the software component run by the first control part itself based on the acquired version renewal data, and transfers the version renewal data to the second control part.

The separate-type signal processing apparatus according to the embodiment of the invention has an advantage such that a situation such that the editions (versions) of the software components differ between devices interconnected by wire or wireless can be effectively prevented from occurring.

DESCRIPTION OF PREFERRED EMBODIMENTS

A separate-type signal processing apparatus according to an embodiment of the invention has a plurality of devices interconnected by wire or wireless. As long as the software components, which the devices contain respectively, work in cooperation to carry out a predetermined process, the separate-type signal processing apparatus is not limited in the number of the devices and details of the predetermined process (functions). However, at least one of the devices shall have a data acquisition part. Hence, the separate-type signal processing apparatus may have at least two devices, i.e. a first device having the data acquisition part, and another device (hereinafter referred to as second device).

As an example can be shown a separate-type signal processing apparatus configured into a system with e.g. a broadcast receiver (set-top box), a display device, and recorder connected to the broadcast receiver. In this case, the broadcast receiver makes the first device, and the display device represents the second device.

The plurality of devices may include a personal computer (hereinafter abbreviated to "PC"). The data acquisition is not limited to means through receipt of broadcast, and it may be data acquisition through a network such as the Internet, and data acquisition through a portable medium such as a memory card. Particularly, in the case of data acquisition through a network or a portable recording medium, PC can be the first device.

In addition, the broadcast receiver, e.g. a set-top box or a PC with a tuner, may be of a digital broadcast receiving type or analog broadcast receiving type.

While a separate-type signal processing apparatus according to an embodiment of the invention will be described below, this is an example in which a television receiver having a set-top box (first device) for digital broadcast receiving and a display device (second device) is connected by a cable.

It should be noted that this embodiment is not limited to a separate-type signal processing apparatus connected by a cable, and various changes and modifications may be made. For example, it is applicable to the case of wireless connection.

Figure 1:
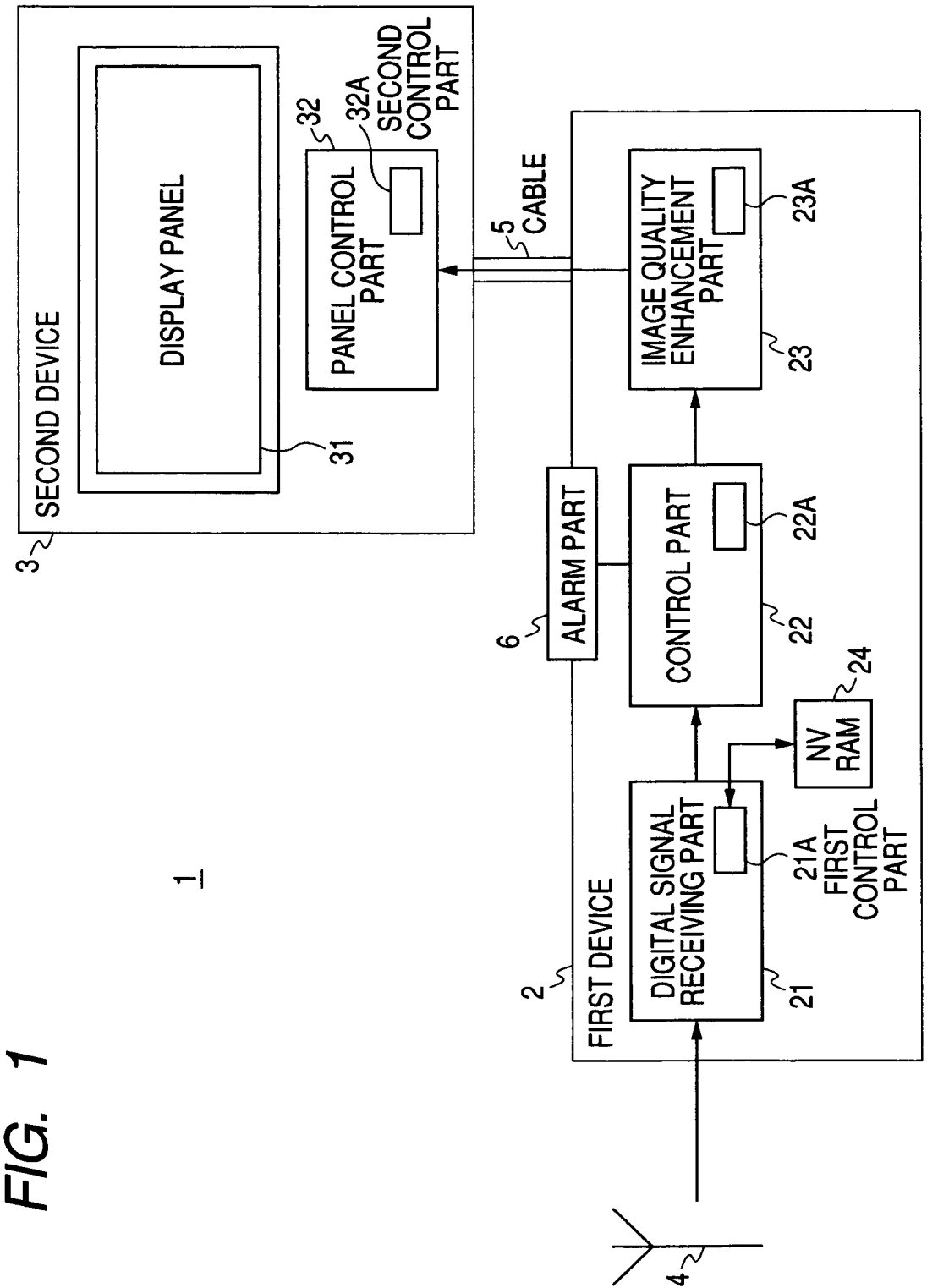
FIG. 1 is a block diagram of a television receiver according to an embodiment of the invention.

FIG. 1 is a block diagram showing a configuration of a television receiver in connection with the embodiment.

The television receiver 1, illustrated in the drawing, has a first device 2 such as a set-top box, and a second device such as a display device.

The first device 2 incorporates a digital signal receiving part 21, which receives a digital broadcast through an antenna 4 connected by a cable with it and carries out a predetermined process, a control part 22, and an image quality enhancement part 23.

The second device 3 incorporates a display panel 31 and a panel control part 32, which previously processes a displayed image and drives the display panel 31.

The television receiver 1 shown in FIG. 1 has the digital signal receiving part 21, control part 22 and image quality enhancement part 23 in the first device 2, and the panel control part 32 in the second device 3, as blocks, each holding a software component (including a program and data) in a built-in or not-shown predetermined memory and having a control part to carry out a process according to the software component.

Specifically, a first control part 21A is provided in the digital signal receiving part 21 inside the first device 2; a second control part 32A is provided in the panel control part 32 inside the second device 3; a third control part 22A is provided in the control part 22 inside the first device 2; and a fourth control part 23A is provided in the image quality enhancement part 23.

Meanwhile, in regard to recent electronic systems, two or more functional blocks are modularized, for example, the functional blocks are formed on individual printed boards. This is not confined to television receivers. A configuration such that each electronic system has a microcomputer or CPU, which controls execution of a function, for each module has been prevalent. The word "microcomputer" is hereinafter abbreviated to "micon."

Specifically, in the example of a television receiver, blocks including a receiving block, an I/O block to control an operation part such as a remote controller and various kinds of input/output parts, a graphic processing block, and a display block each have a micon. Such micons communicate mutually. Thus, the television receiver is arranged to carry out a process appropriately as a whole. The reasons for the adoption of this configuration are as follows. The first is that a CPU will be overloaded particularly by a receiving process, graphic process, etc. and as such, it is necessary to carry out processes with a heavy load in parallel. The second is to enable execution of other process in response to an interruption thereby to comply with a demand for increase of its total process efficiency.

To comply with such demand, the digital signal receiving part 21, control part 22, image quality enhancement part 23, and panel control part 32, which are shown in FIG. 1, are processing blocks each having a control part (the first control part 21A to fourth control part 23A) including e.g. a micon or CPU. Therefore, the first control part 21A to fourth control part 23A are interconnected so that they can communicate with one another through a bus construction or by a connection form other than that, which is not particularly shown in the drawing. Thus, the control parts are arranged so as to be able to send and receive an instruction, other control signals, and data.

Specifically, under the control of the first control part 21A, the digital signal receiving part 21 extracts a carrier corresponding to a selected target channel from a digital broadcast wave input thereto, carries out a predetermined demodulation process, error correcting process and encryption release process, and decodes broadcast data (i.e. video and sound data) and various kinds of additional information. In the case where the software component is multiplexed, version renewal data for the software component is separated from the digital broadcast wave and stored in a predetermined memory.

Under the control of the third control part 22A, the control part 22 controls the whole first device 2, and particularly performs power source management and decodes an instruction from the operation part including a remote controller, which is not shown in the drawing, and follows the instruction to control other blocks (e.g. digital signal receiving part 21 and image quality enhancement part 23).

The image quality enhancement part 23 performs various kinds of processes to achieve a higher image quality, e.g. edge enhancement, color correction, tone correction and white balance control under the control of the fourth control part 23A.

The panel control part 32 performs a video signal process, a presentment-of-OSD process, etc. depending on the characteristics of the display panel 31 under the control of the second control part 32A.

Incidentally, in FIG. 1, a group of arrows starting from the antenna 4, passing through the digital signal receiving part 21, control part 22, and image quality enhancement part 23 toward the panel control part 32 shows a flow of received data processing.

In this embodiment, the individual blocks are arranged so as to renew (or update) the software component including a program and data used to run the program, in the order in which the received data is transmitted and processed, wherein the program is run by the respective built-in control parts (i.e. first control part 21A to fourth control part 23A). Therefore, a nonvolatile memory (NVRAM) 24 is connected to the first control part 21A as a memory to accumulate software component data (version renewal data) for renewal by download, which has been initially received through the antenna 4.

Version renewal (version upgrade) data are classified into: the data prepared on the assumption that version upgrade is performed by overwriting all the contents of the program, etc.; and the data prepared on the assumption that version upgrade is performed by partially overwriting the contents of the program, etc. or adding an additional content to them. Which type of data is adopted depends on e.g. the configuration of the control part (first control part 21A to fourth control part 23A) that carries out the program. Here is assumed the former case where all the contents of the program, etc. are replaced including portions subjected to overwriting and addition of a new content thereto and a portion which has not undergone overwriting.

However, the application of the invention does not have to be limited to the above-described sequence and the case of updating a software component.

Specifically, the invention is applicable to an arrangement such that after all the version renewal data have been accumulated in (or downloaded into) a memory of a certain block, e.g. NVRAM 24 of the digital signal receiving part 21, the version renewal data necessary for other blocks are transferred to the blocks in parallel, and then the version renewal data are installed on storage areas for the programs, etc. for update.

The version renewal data may be transferred in a compressed form and expanded in the individual control parts before installation. Alternatively, the version renewal data after expansion may be transferred to the control parts.

In the configuration shown in FIG. 1, the image quality enhancement part 23 and panel control part 32 are made to be able to mutually communicate by a cable 5 connecting between the first device 2 and second device 3. Therefore, when the cable 5 is pulled out, the communication between them becomes difficult, and the transfer of version renewal data of the software component also becomes difficult.

As for the time of pulling out the cable 5, various cases including the following Cases (1) to (5) are conceivable. Case (1) where the cable 5 has been pulled out prior to download which includes receiving version renewal data and storing in NVRAM 24. Case (2) where the cable 5 is pulled out in the middle of download. Case (3) where the cable 5 is pulled out in the middle of installation of version renewal data on the blocks in the first device 2 after download. Case (4) where the cable 5 is pulled out between the start of transfer of version renewal data to the panel control part 32 and the completion of installation thereof after installation on the first device 2 has been finished. Case (5) where the cable 5 is pulled out after completion of installation on all the blocks. Of those cases, Case (5) has no problem because installation (update) on all the blocks targeted for renewal of the software component has been completed at the time of pulling out the cable 5.

In regard to any of an arrangement such that installation (update) of version renewal data is performed in the order of the digital signal receiving part 21, control part 22, image quality enhancement part 23, and panel control part 32 as described above, and an arrangement such that update on the parts is performed in parallel, pulling out the cable 5 at a time applying to any of Cases (1) to (4) except Case (5) can bring the television receiver 1 to the condition where the update for some or all of the blocks in the first device 2 have been completed, whereas update for the panel control part 32 in the second device 3 has not been finished, in general.

Figure 2:
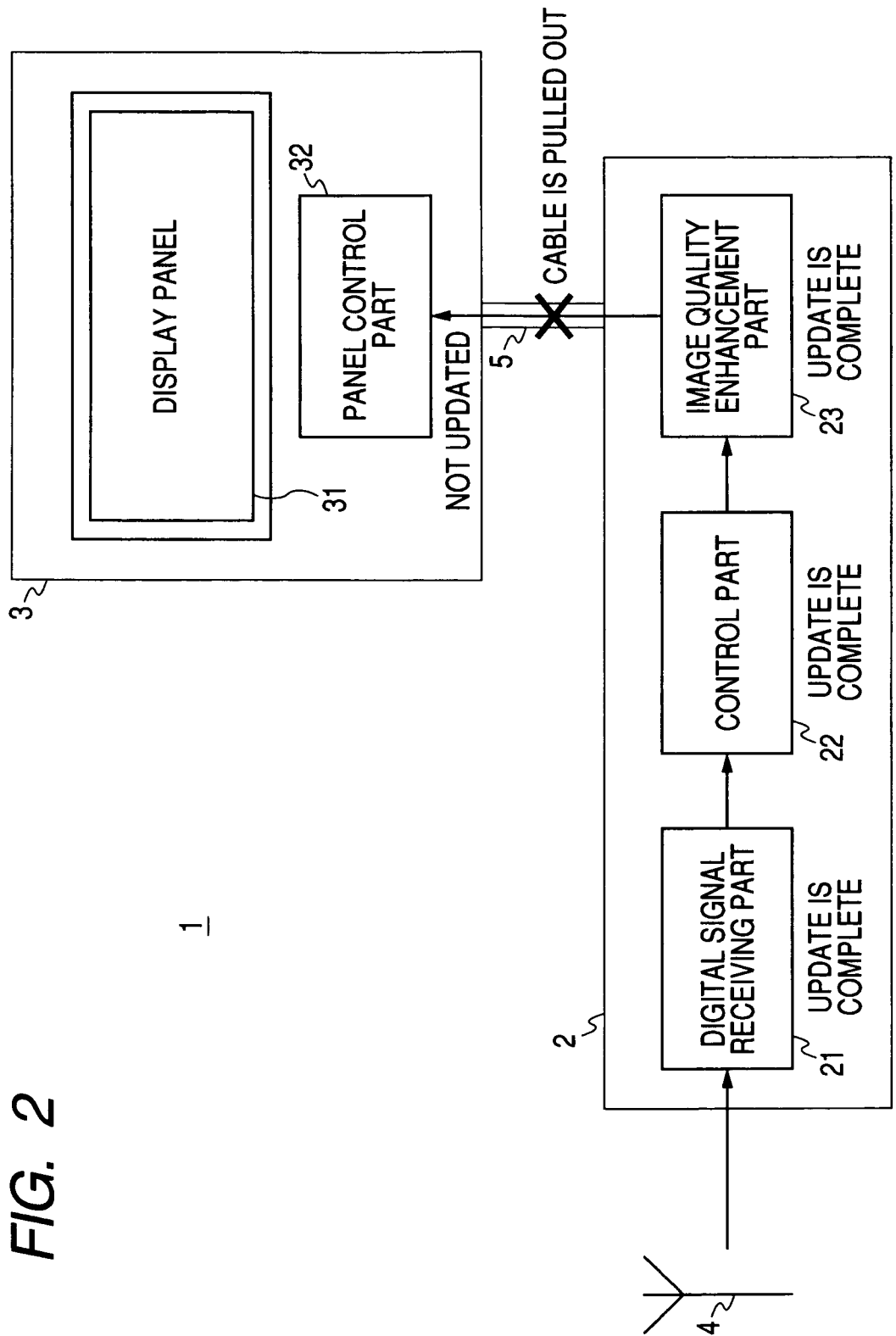
FIG. 2 is a block diagram showing a situation where a cable has been pulled out after data installation on an image quality enhancement part 23.

Of these cases, FIG. 2 is an explanatory view showing Case (4).

Shown in FIG. 2 is the case where in updating the software component of each block (i.e. digital signal receiving part 21 to panel control part 32) according to the same procedure as that of the received data processing, the cable 5 is pulled out during a period of time from update of the image quality enhancement part 23 to completion of update of the panel control part 32. In this case, it is difficult for the panel control part 32 to send the first device 2 a signal to notify completion of the update and as such, it becomes difficult to normally finish the process flow of version upgrade of the software component, resulting in an error. As a result, the process is forced to terminate. When such forced termination is caused, only the parts other than the panel control part 32 are updated, while update of the panel control part is not completed.

As a result, the software component differs in version among the blocks, which tends to cause a trouble such as turbulence of a screen image, and finally which can prevent the whole system from being started up.

Hence, in this embodiment, in the process flow of version upgrade of the software component, the control part (i.e. first control part 21A) controlling the download notifies control parts of the other blocks, i.e. third control part 22A, fourth control part 23A, and second control part 32A, of completion of the first download of the version renewal data, waits for the replies from them, and then starts the installation (update) of the version renewal data on receipt of the replies.

Accordingly, when the first control part 21A does not receive any response signals from the other control parts after having sent a notice signal to the control parts, it presumes that there is a trouble owing to some cause in a connection-routing line, and does not start the update. On the contrary, when the control parts of the blocks send out reply signals, the process flow of the update is started on receipt of all the reply signals.

Thus, even in the case where the cable 5 is pulled out at any time, it is possible to prevent the occurrence of a situation such that control parts of the blocks are not partially updated.

In the case where the cable 5 is pulled out in the course of the update process flow after the process flow has been started, the process is controlled as follows.

Even in the case where the cable 5 is pulled out in the middle of update for the blocks inside the first device 2, such as the digital signal receiving part 21, control part 22, and image quality enhancement part 23, and specifically in the middle of data transfer for the update, the process flow is not suspended in midstream, and is advanced as onward as possible. Even when the fourth control part 23A tries sending the version renewal data to the second control part 32A for the purpose of update of the panel control part 32 after update of the image quality enhancement part 23 has been completed, the data transmission results in failure because the cable 5 has been pulled out. Also, in this case, the process flow is not suspended and the attempt to send the data is repeated.

However, connection of the cable 5 is not restored only by such attempt, as is often the case.

Hence, it is desirable that the data transmission is repeated on one hand, and e.g. an alarm part 6 connected to the control part 22 is provided as shown in FIG. 1 to warn for the purpose of urging a user to confirm the connection of the cable on the other hand.

The alarm part 6 is provided on I/O of the first device 2, which may be any means as long as it is operative to notify a user that the cable is not connected, through e.g. indication of a text, an icon or the like by an operating display, output of sound and/or voice by a speaker, or lighting or flashes of an LED.

When the user notices the warning and connects the cable 5, the process flow of update can be prosecuted to the end without wasting the process finished by that moment although there is some downtime. Therefore, also in this case, it is possible to prevent the occurrence of such a situation that control parts of the blocks are not partially updated.

Figure 3:
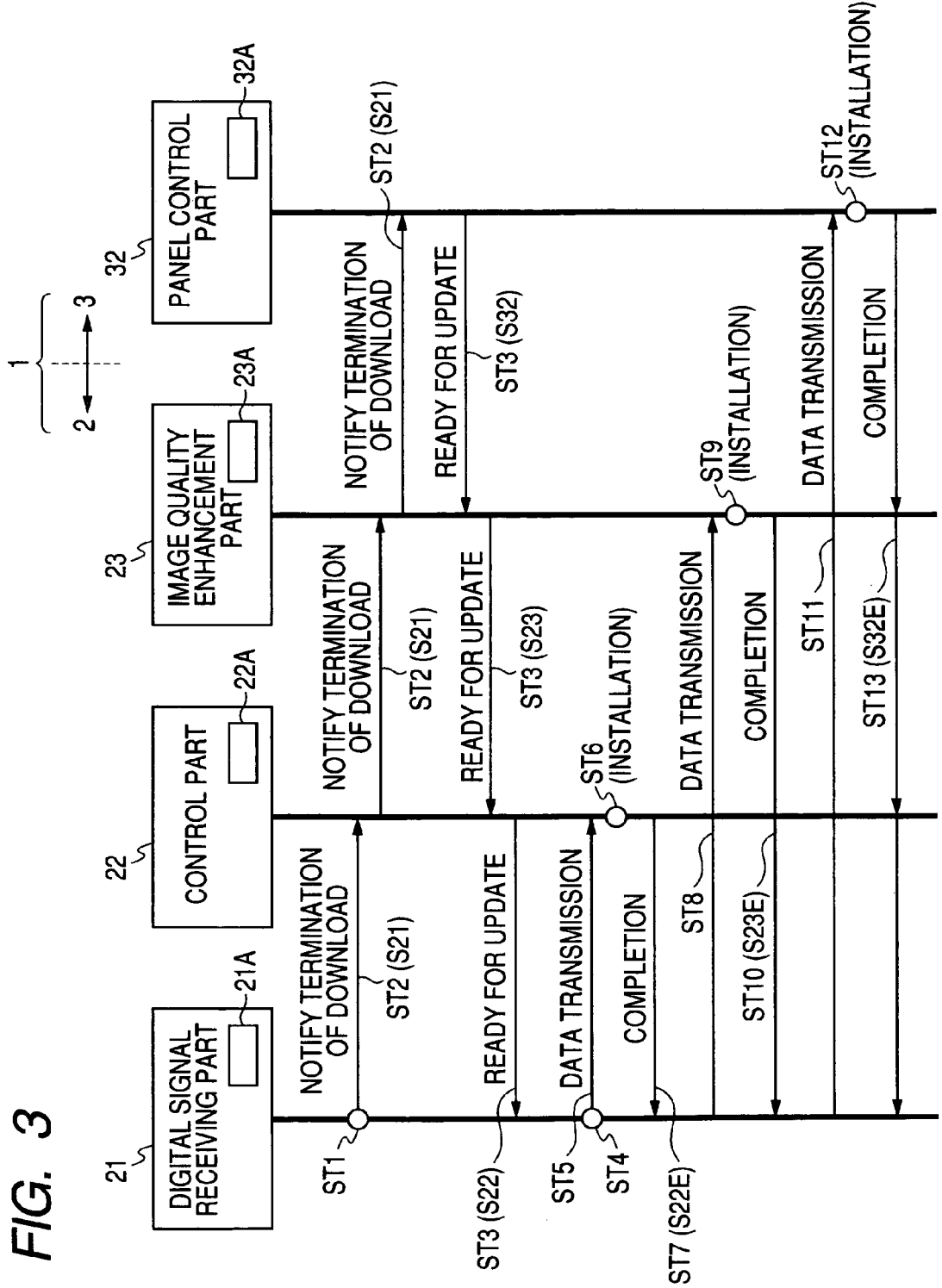
FIG. 3 is an operational sequence diagram of the embodiment when the cable is connected normally.
Figure 4:
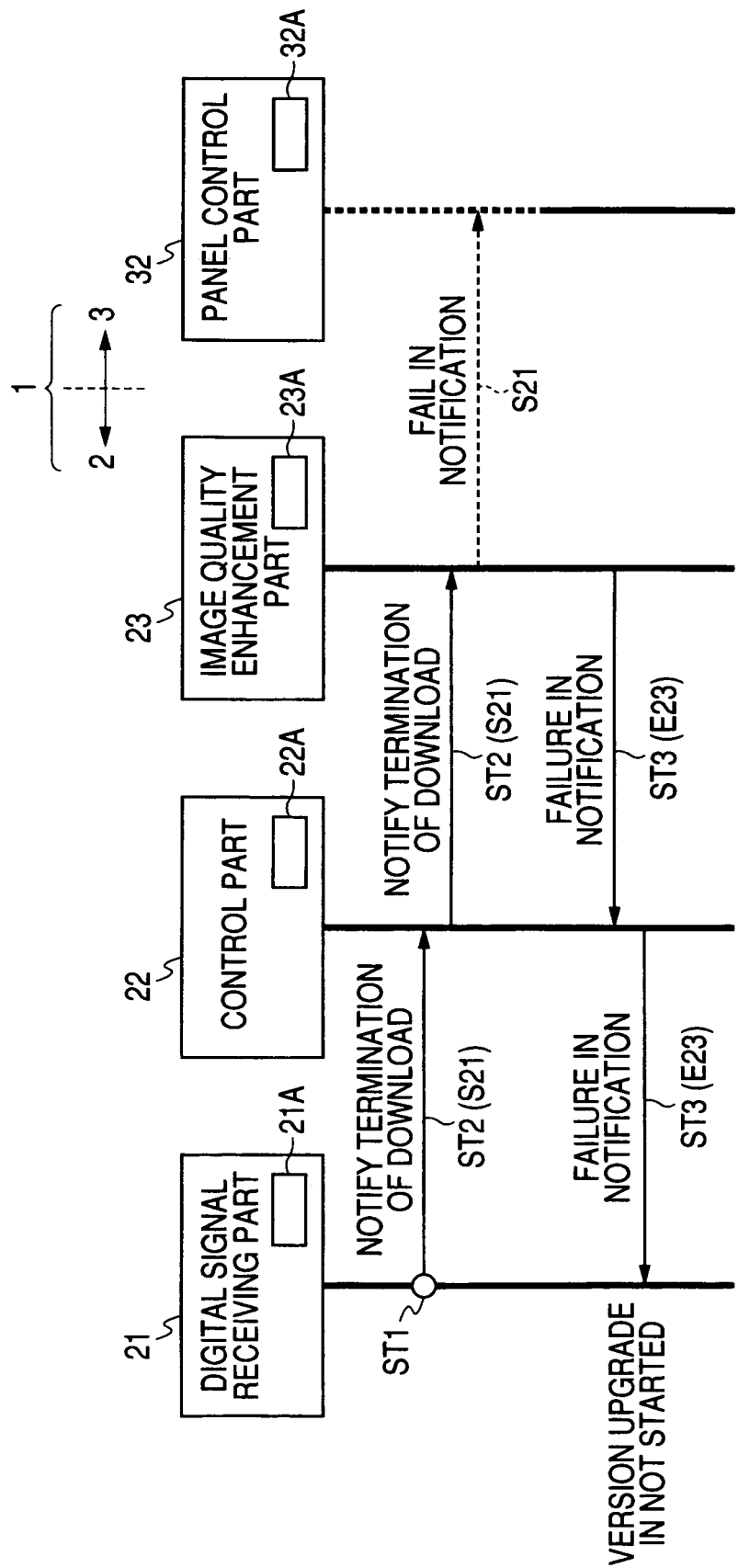
FIG. 4 is an operational sequence diagram when the connection of the cable has been faulty from the beginning.
Figure 5:
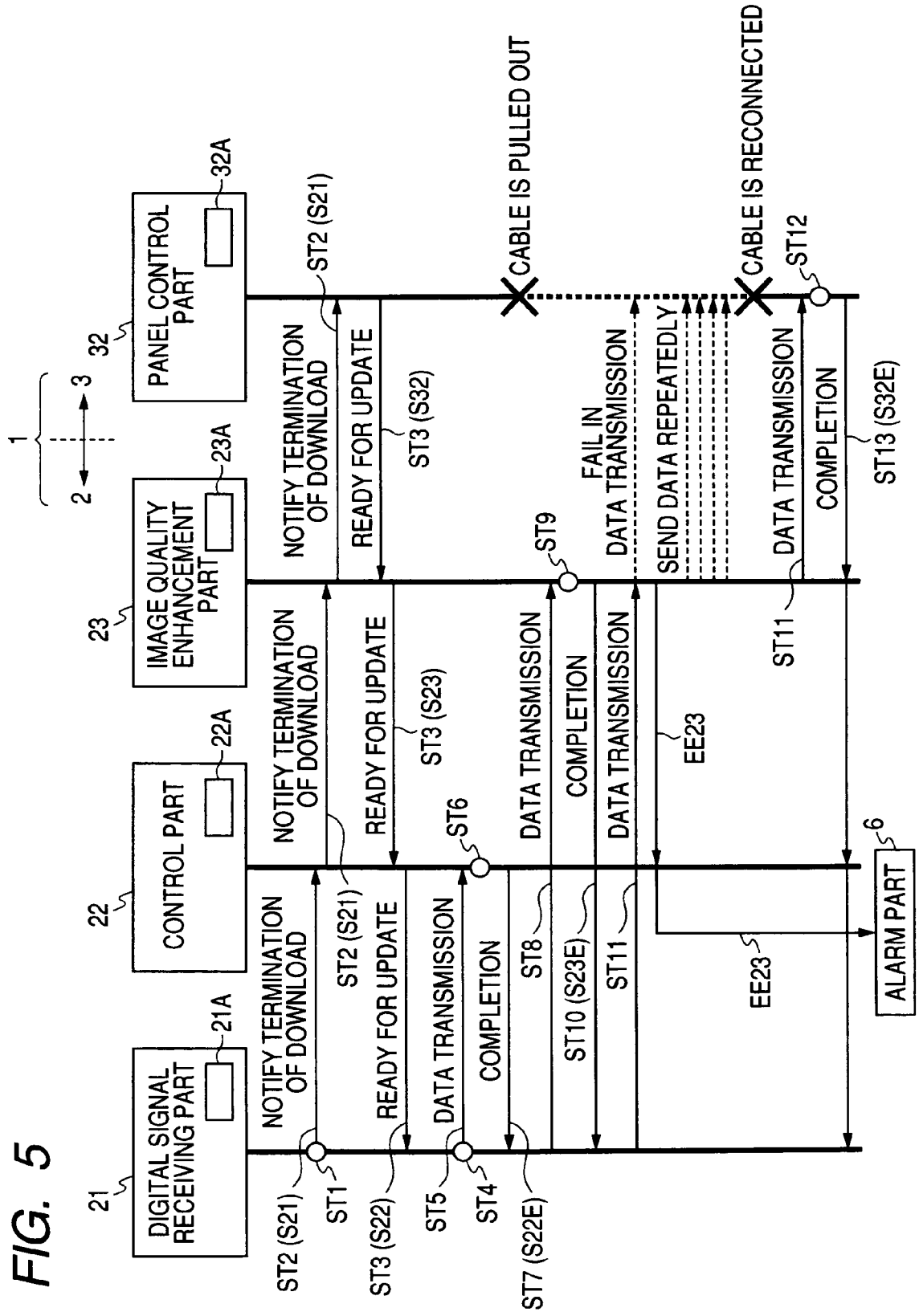
FIG. 5 is an operational sequence diagram when the connection of cable is made faulty after termination of download.

Next, the control mentioned above will be described with reference to the specific operational sequences (FIGS. 3 to 5).

Referring to FIG. 3, there is shown a sequence of operations for software component version upgrade in the case where the cable connection is normal. FIG. 3 shows processes executed by the digital signal receiving part 21, control part 22, image quality enhancement part 23 and panel control part 32 shown in FIG. 1 and flows of the processes among the parts. Specifically, signals are exchanged among the control parts in these parts, namely the first control part 21A, third control part 22A, fourth control part 23A, and second control part 32A.

According to the sequence, the digital signal receiving part 21 acquires or downloads the download data (i.e. version renewal data) (Step ST1), and issues a notice signal S21 to notify the control part 22 of the termination of download (Step ST2). The download notice signal S21 is passed on through the control parts of the control part 22 and image quality enhancement part 23 by relay, and finally sent to the control part (second control part 32A) of the panel control part 32. Thus, the respective parts gain information of the termination of download.

The control part 22, image quality enhancement part 23, and panel control part 32 send the digital signal receiving part 21 response signals S22, S23 and S32 to notify the receiving part 21 that the parts are ready for update of the software component contained in each part in response to receipt of the notice signal S21 to make a notification of the termination of download (Step ST3). The response signal S23 is relayed by the control part 22, and the response signal S32 is relayed by the image quality enhancement part 23 and control part 22.

The digital signal receiving part 21 starts update of the software component (installation of the version renewal data on the parts) under the condition where it has received all of the response signal S22 from the control part 22, the response signal S23 from the image quality enhancement part 23, and the response signal S32 from the panel control part 32.

First, the first control part 21A in the digital signal receiving part 21 will use a boot program in a program-storing memory to update its own program (and its attachment data). For the purpose of this, the first control part 21A decompresses (or expands) the appropriate data of acquired version renewal data, and installs the resultant data on the program-storing memory (Step ST4).

Second, the first control part 21A transfers the version renewal data required for update of the control part 22 to the control part 22 (Step ST5). Then the third control part 22A uses a boot program in the program-storing memory to decompress (or expand) the transferred version renewal data and install the resultant data on the program-storing memory for the purpose of update of its own program (and its attachment data) (Step ST6). When the installation is finished normally, the control part 22 (exactly, the third control part 22A) sends a completion-of-installation notice signal S22E to the digital signal receiving part 21 (the first control part 21A).

Also, the operations for the data transmission, installation, and notification of the completion are executed with respect to the image quality enhancement part 23 and panel control part 32, respectively (Steps ST8 to ST13).

In the data transmission at Steps ST5, ST8 and ST1, the version renewal data is divided into predetermined units, and they are output from the digital signal receiving part 21 for each of the predetermined units. In FIG. 3, while the data transmission is represented by an arrow, the control part 22, image quality enhancement part 23, and panel control part 32 receive version renewal data multiple times in fact.

When the digital signal receiving part 21 (the first control part 21A) receives a completion-of-installation notice signal S32E from the panel control part 32 (the second control part 32A), the version upgrade process of the software component is completed.

Referring to FIG. 4, there is shown a sequence in the case the cable 5 connecting between the display panel and the box is pulled out before download (see FIG. 2).

In this case, the termination-of-download notice signal S21 does not reach the panel control part 32 (the second control part 32A) (STEP ST2). Therefore, the image quality-enhancement part 23 sends the control part 22 (the third control part 22A) an error signal E23 to notify the failure in notification of termination of download. The third control part 22A relays the error signal E23 to send the signal to the digital signal receiving part 21 (the first control part 21A).

When the first control part 21A receives the error signal E23, it gains the information of the cable 5 in a faulty connection, and therefore it does not start installation of the version renewal data (version upgrade of the software component), which has been acquired through download.

However, the digital signal receiving part 21 holds the download data in the NVRAM 24 connected thereto and as such, when it is activated next time, the digital signal receiving part 21 issues the notice signal S21 again to check if it is possible to upgrade the version of the software component. In the case the connection condition of the cable 5 is found to be satisfactory when the digital signal receiving part 21 receives all the reply signals, version upgrade of the software component is performed as shown in FIG. 3. Then, when the error signal E23 is sent back, the version upgrade is not performed.

It is desirable in the sense of improvement of the responsivity that the image quality enhancement part 23 issues the error signal E23. However, this is not essential. In the case where the image quality enhancement part 23 sends back no error signal E23, the digital signal receiving part 21 may decide not to perform the version upgrade of the software component when the digital signal receiving part 21 does not receive all the response signals within a predetermined length of time after having issued the termination-of-download notice signal S21.

Referring to FIG. 5, there is shown a sequence in the case where the connection of the cable 5 connecting between the first device 2 and second device 3 is satisfactory right after start of the download, but the cable is pulled out along the way.

The cable 5 is connected in position right after the download, and the digital signal receiving part 21 issues the termination-of-download notice signal S21 (Step ST2), which is also transmitted to the panel control part 32. Thus, the parts send response signals S22, S23 and S32 back to the digital signal receiving part 21, whereby it is notified that the parts are ready for version upgrade of the software component.

It is assumed that the cable 5 is pulled out from the first device 2 or second device 3 after the point of time.

In this case, as it is difficult for the digital signal receiving part 21 to gain information of the condition of the cable having been changed to faulty connection, the digital signal receiving part 21 starts the operation for version upgrade of the software component. Then, the data installations on the digital signal receiving part 21 (Step ST4), the control part 22 (Step ST6), and the image quality enhancement part 23 (Step ST9) are completed, and the notice signal 23E to notify the completion is sent back to the digital signal receiving part 21.

Subsequently, the digital signal receiving part 21 outputs the version renewal data to be installed on the panel control part 32, which is relayed by the control part 22 and image quality enhancement part 23. However, the image quality enhancement part 23 fails the data transmission because of the faulty connection of the cable when transferring the output data to the panel control part 32.

In this embodiment, the process is not forced to be terminated at this point. The image quality enhancement part 23 issues an error signal EE23 to notify the failure in data transmission to the alarm part 6 through the control part 22 (the third control part 22A). Then, the image quality enhancement part 23 repeats the transmission of the version renewal data in the predetermined units regularly again and again, which the part 23 failed in.

The alarm part 6 notifies a user of the faulty connection of the cable through a picture (e.g. a text or an icon), sound and/or voice, or light (e.g. lighting or flashes of an LED), and urge the user to reconnect the cable.

When the user, who has gained the information of faulty connection of the cable by the warning from the alarm part, troubleshoots the problem of cable connection to make the cable a satisfactory condition, the data transmission from the image quality-enhancement part 23 to the panel control part 32 can be made possible. After that, all the data transmissions in the predetermined units are terminated, and data installation on the panel control part 32 is executed (Step ST12). When the completion-of-installation notice signal S32E to notify that the installation has been finished, is delivered from the panel control part 32 to the digital signal receiving part 21, the process of version upgrade is completed.

In this embodiment, in reconnection of the cable, when another display device is connected to the first device 2 during version upgrade of the software component, the panel control part of the connected display device recognizes that data is transferred to itself not even in the middle of the version upgrade. As a result, the data transferred to the display device is renounced, and therefore the installation is not performed. In this case, the image quality enhancement part 23 sends an error signal to show that the display device is different through the control part 22 to the alarm part 6. Hence, it is desirable that the alarm part 6 informs a user that another display device is connected in order to urge the user to reconnect the cable to the original display device (the second device 3).

Now, it is assumed as another case that the cable 5 is pulled out in the middle of transfer of the download data (version renewal data). According to the sequence described with reference to FIG. 5, sending the data is continued until connection of the cable 5 is made satisfactory. Therefore, the sequence of the process is restarted normally from the stage at the time when the cable was pulled out, and the update of the software component can be carried out with no problem.

Another possible situation is that the power supply to the panel or box is cut off concurrently with pulling out the cable 5. In this case, the following alteration may be made. That is, information on the progress of version upgrade is placed into a nonvolatile memory (not shown) that each of the blocks (digital signal receiving part 21, control part 22, image quality enhancement part 23 and panel control part 32) has. When the panel or box is powered on the next time, an uncompleted portion of version upgrade of the software component is restarted from the stage where the version upgrade was interrupted, based on the information concerning the progress.

In this embodiment, a notice signal to notify termination of download of the version renewal data is sent to the parts targeted for the update, and the actual update (data installation) is started after reply signals from all the parts have been received. Therefore, it is possible to prevent the occurrence of a situation such that the blocks differ in the version of the software component installed thereon.

The process to match the versions mutually makes it possible to cope with cases where the cable is pulled out with any timing, including: the case where the cable has been pulled out prior to the download; and the case where the cable has been pulled out particularly in the middle of data transmission after the download.

Further, as the separate-type signal processing apparatus has a means to notify a user of faulty connection of the cable, there is a high probability that a faulty connection of the cable will be troubleshot thereby to bring the cable to a satisfactory condition. When the cable connection is made satisfactory, the process is restarted from the stage where it was interrupted. On this account, the process efficiency is higher than that in the case where the process is started from the beginning.

Still further, the separate-type signal processing apparatus behaves safely by suspending the process, and issuing a warning in the case where another display device, which has not been subjected to the version upgrade, is connected.

In the meanwhile, it is also conceivable to adopt, as a means for avoiding a problem arising in version upgrade, the method including incorporating a nonvolatile memory in a broadcast receiver main body, writing download data in an area other than an area which is functioning during the update, and starting from a new area at the time of next start-up after the download has been terminated normally.

However, use of the method requires a nonvolatile memory having twice the normal capacity, which is inefficient remarkably.

In contrast, the method according to the embodiment has an advantage such that the download can be continued safely without using a large amount of the capacity that a nonvolatile memory has even when the cable is pulled out.

It should be understood by those skilled in the art that various modifications, combinations, sub-combinations and alterations may occur depending on design requirements and other factors insofar as they are within the scope of the appended claims or the equivalents thereof.

What is claimed is:

1. A separate-type signal processing apparatus comprising:
a first device having a data acquisition part; and
a second device connected with the first device by wire or wireless,
wherein the first and second devices work in cooperation to execute a predetermined process,
the first device acquires version renewal data for addition to or renewal of software components for respectively controlling the first and second devices, through the data acquisition part,
the first device has a first control part and a third control part that works in cooperation with the first control part to execute the predetermined process, wherein the first control part is for sending a completion-of-acquisition notice signal indicating completion of acquisition of the version renewal data by the first device to the third control part and through the third control part to the second device,
the second device has a second control part for sending a response signal indicating the second control part is ready for renewal of the software component run by the second control part itself to the first control part when the notice signal is input thereto, wherein the third control part is for sending a response signal indicating the third control part is ready for renewal of the software component run by the third control part itself to the first control part when the notice signal is input thereto, and
the first control part renews at least a part of the software component run by the first control part itself based on a part of the acquired version renewal data relevant to the first control part, and transfers to the second control part at least a part of the acquired version renewal data relevant to the second control part, under condition of receipt by the first control part of all of the response signal from the second control part and the response signal from the third control part as an input thereto.

2. The separate-type signal processing apparatus of claim 1, wherein on input of the response signal, the first control part transfers the version renewal data to the second control part after the renewal.

3. The separate-type signal processing apparatus of claim 1,
the third control part relays the notice signal sent from the first control part toward the second control part, and
the third control part sends an error signal to the first control part when the response signal is not returned.

4. The separate-type signal processing apparatus of claim 3, further comprising an alarm part for warning of defective connection between the first and second devices in response to sending of the response signal or error signal.

5. The separate-type signal processing apparatus of claim 4, wherein when it becomes impossible to send a certain predetermined unit while the first control part is sending the version renewal data to the second control part in predetermined units, the first control part repeats sending of the certain unit of version renewal data failed in sending, and forces the alarm part to warn of the defective connection.

6. The separate-type signal processing apparatus of claim 1, wherein the first device has: a memory for accumulating the acquired version renewal data; a first processing part including the first control part; and a second processing part having the third control part,
the first and second processing parts respectively read out the relevant version renewal data from the memory and install the version renewal data on software component storage areas of the first and third control parts thereby to execute version renewal, and then read out version renewal data relevant to the second control part in the second device from the memory and transfer the read version renewal data to the second control part, and
the second control part executes version renewal of a software component stored therein based on the transferred version renewal data.

7. A method of renewing versions of software components of a separate-type signal processing apparatus having a first device and a second device connected with the first device by wire or wireless, in which the first device has a first control part and a third control part, in which the software components contained in the first and second devices respectively work in cooperation thereby to execute a predetermined process, the method comprising the steps of:
acquiring version renewal data for addition to or renewal of the software components by the first device;
sending a completion-of-acquisition notice signal indicating completion of acquisition of the version renewal data by the first device from the first control part of the first device to the third control part and through the third control part to the second device;
sending a response signal indicating the second control part is ready for renewal of the software component run by the second control part itself from the second device to the first control part in response to input of the notice signal thereto, and sending a response signal indicating the third control part is ready for renewal of the software component run by the third control part itself from the third control part to the first control part in response to input of the notice signal thereto; and
after the first control part has performed renewal of a version of the software component contained therein using a part of the version renewal data relevant to the first control part under condition of receipt by the first control part of all of the response signal from the second control part and the response signal from the third control part, transferring a part of the version renewal data relevant to the second device from the first device to the second device to perform renewal of a version of the software component contained in the second device.

\* \* \* \* \*